(12) United States Patent
Deng

(10) Patent No.: US 6,772,311 B2
(45) Date of Patent: Aug. 3, 2004

(54) ATAPI DEVICE UNALIGNED AND ALIGNED PARALLEL I/O DATA TRANSFER CONTROLLER

(75) Inventor: Brian Tse Deng, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 242 days.

(21) Appl. No.: 10/179,146

(22) Filed: Jun. 24, 2002

(65) Prior Publication Data

US 2003/0236960 A1 Dec. 25, 2003

(51) Int. Cl.[7] .............................................. G06F 13/00
(52) U.S. Cl. ..................... 711/168; 711/100; 710/52
(58) Field of Search .................................. 711/100, 150, 711/168, 169; 710/36, 52

(56) References Cited

U.S. PATENT DOCUMENTS

| | | | |
|---|---|---|---|
| 5,167,551 A | * 12/1992 | Davis | 441/57 |
| 5,661,848 A | * 8/1997 | Bonke et al. | 711/112 |
| 6,609,167 B1 | * 8/2003 | Bastiani et al. | 710/104 |
| 6,636,922 B1 | * 10/2003 | Bastiani et al. | 710/305 |
| 6,697,885 B1 | * 2/2004 | Goodfellow | 710/22 |

* cited by examiner

*Primary Examiner*—Tuan V. Thai
(74) *Attorney, Agent, or Firm*—Frederick J. Telecky, Jr.; W. James Brady, III

(57) ABSTRACT

A controller that supports both aligned and unaligned PIO data transfers associated with ATAPI devices in a fashion that reduces command overhead to improve ATAPI device system performance. A 32-bit wide sector FIFO, implemented with a 32-bit single port RAM using read and write pointer control logic, is used to store packet data transmitted to and received from the other data bus (i.e. USB). The 32-bit single port RAM functions as a FIFO to allow both the USB side and the ATAPI side to simultaneously access the sector FIFO.

18 Claims, 5 Drawing Sheets

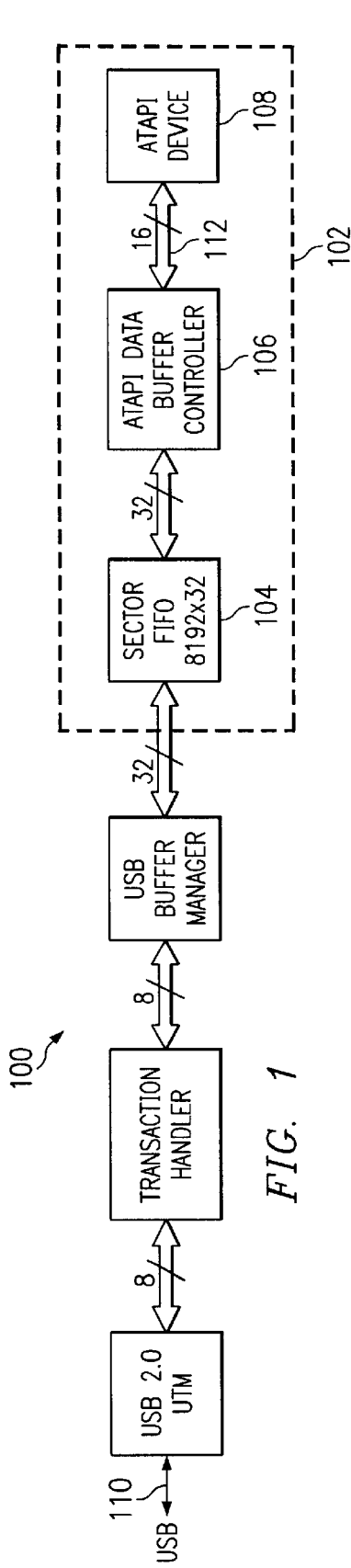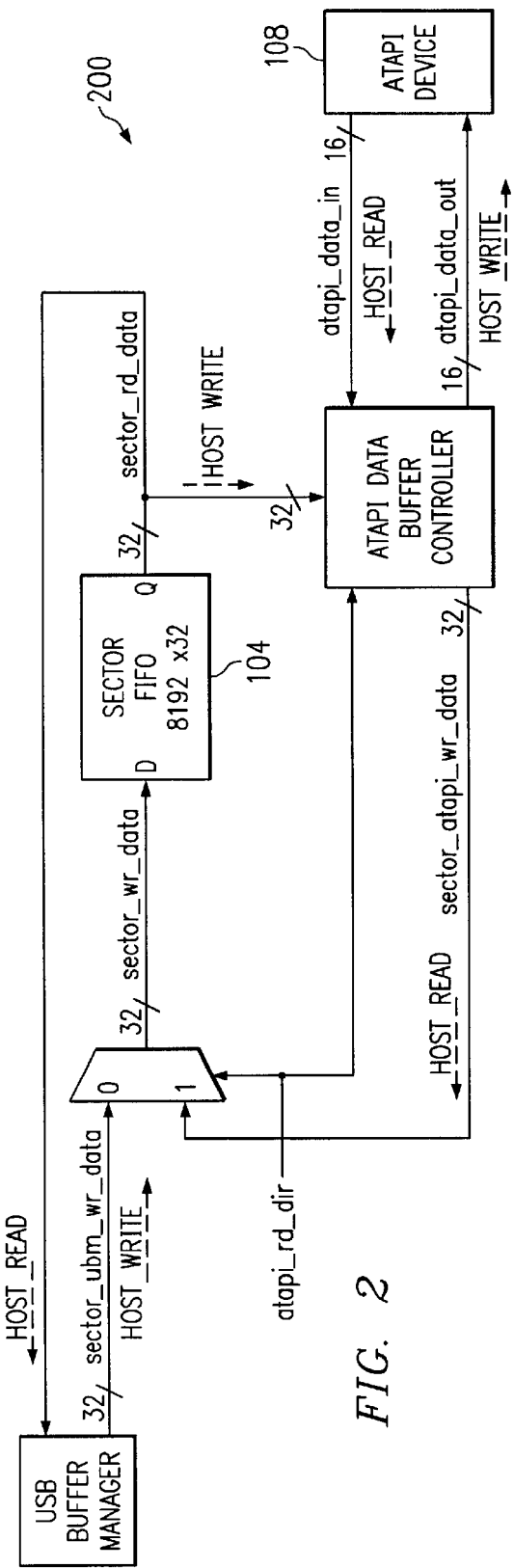
FIG. 1
FIG. 2

ATAPI DEVICE UNALIGNED AND ALIGNED PARALLEL I/O DATA TRANSFER CONTROLLER

BACKGROUND OF THE INVENTION

1. Field of the Invention

This invention relates generally to Advanced Technology Attachment Packet Interface (ATAPI) device data transfer, and more particularly to a system and method for allowing an ATAPI device to accommodate both unaligned and aligned parallel I/O data transfers.

2. Description of the Prior Art

An AT Attachment Packet Interface (ATAPI) for CD-ROMs is an extension of the ATA Interface that supports connection of CD-ROM players and tape players to personal computers. The ATAPI Standard (SFF-8020i) defines a Task File, a set of registers used by the peripheral devices and personal computer, used to transfer data. According to ATAPI, commands are communicated using packets. Generally described, a packet is a portion of a message, that may include many packets. Typically, each packet includes destination information and data, or a payload. A packet may also include a packet ID (PID), data, that forms the packet payload, and a cyclical redundancy check (CRC). Because each packet of a message includes a PID, packets need not be transmitted in order to successfully reconstruct the message. Many protocols using packets support isochronous data transfer, as compared to synchronous data transfer. Isochronous data transfer enables video data to be transmitted as quickly as it is displayed and generally supports very high data transfer rates.

ATAPI devices are however, only required to support aligned parallel I/O (PIO) data transfers since the ATAPI standard does not support unaligned PIO data transfers. The ATAPI standard allows only the last DRQ data transfer to have an odd byte count, while necessitating that all other DRQ data transfers have an even byte count in order to avoid unaligned PIO data transfers.

Unaligned PIO data transfer capability allows users to bundle several arbitrary byte count transfers into a single command transaction. This is desirable since multiple command transactions would otherwise be required whenever there is an odd byte count transfer. Known solutions to the foregoing problem have either prohibited unaligned data transfers or have used firmware to move data to or from ATAPI devices whenever the logic detected unaligned data transfers, which has degraded data transfer performance whenever unaligned data transfers occurred.

It is therefore advantageous and desirable in view of the foregoing, to provide a method and system of implementing unaligned PIO data transfer capability to improve ATAPI device system performance by reducing command overhead. Such a method and system would provide a desirable feature for ATAPI device host controllers.

SUMMARY OF THE INVENTION

The present invention is directed to a controller that supports both aligned and unaligned PIO data transfers associated with ATAPI devices in a fashion that reduces command overhead to improve ATAPI device system performance. A 32-bit wide sector FIFO, implemented with a 32-bit single port RAM using read and write pointer control logic, is used to store packet data transmitted to and received from the other data bus (i.e. USB). The 32-bit single port RAM functions as a FIFO to allow both the USB side and the ATAPI side to simultaneously access the sector FIFO.

According to one embodiment, a parallel input/output data transfer controller comprises a sector FIFO in simultaneous communication with a host device and an ATAPI device; and an ATAPI data buffer controller, wherein the ATAPI data buffer controller is configured to control sector FIFO read and write operations such that the sector FIFO communicates simultaneously with the host device via a host data bus and with the ATAPI device via an ATAPI device bus.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawing wherein:

FIG. 1 is block diagram depicting a data transfer control system according to one embodiment of the present invention;

FIG. 2 is a more detailed block diagram illustrating simultaneous data transfer read and write operations between a host device and a 32-bit sector FIFO, as well as between an ATAPI device and the 32-bit sector FIFO according to one embodiment of the present invention;

Figure 3:
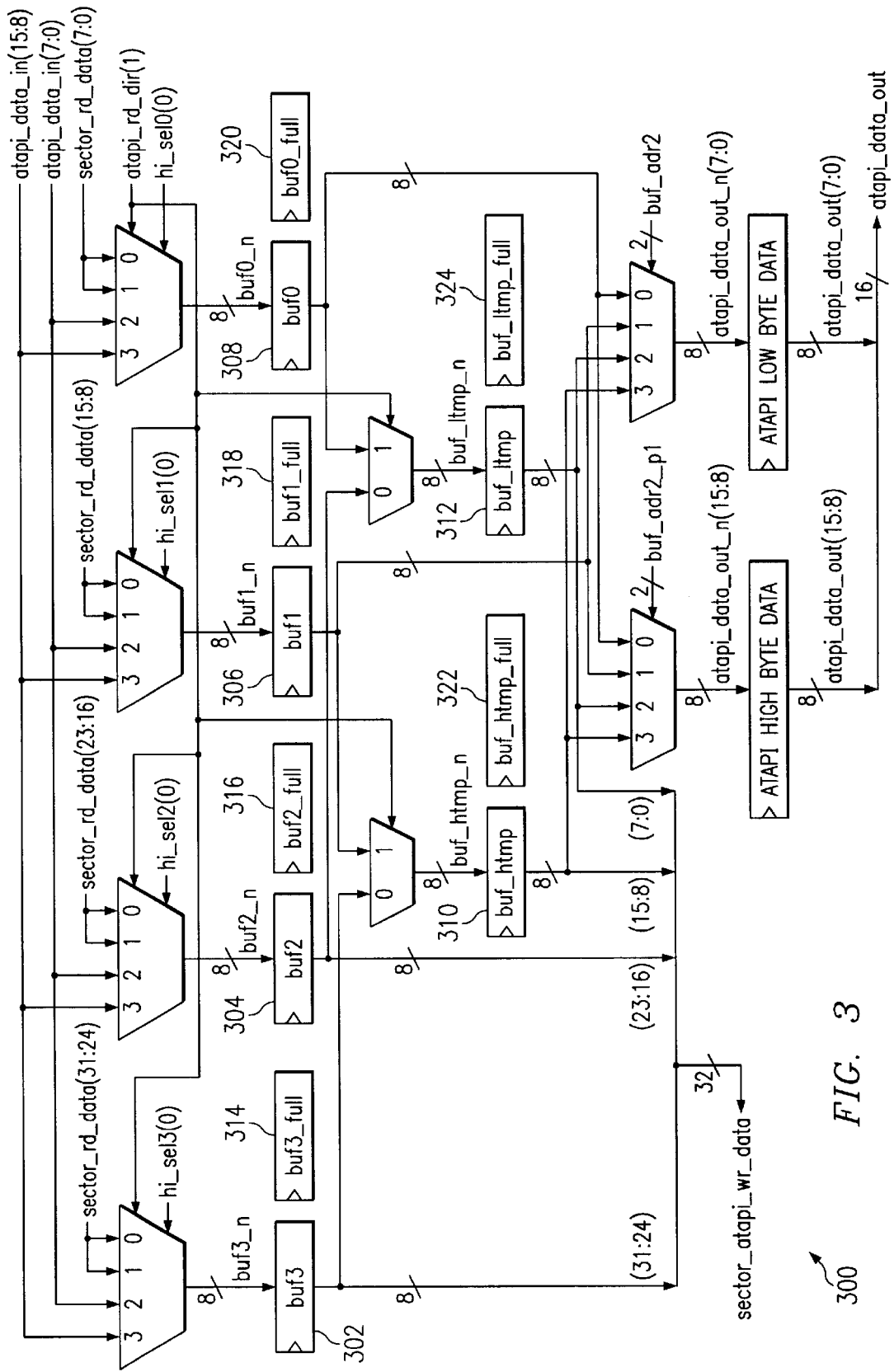
FIG. 3 is a more detailed block diagram of the ATAPI data buffer controller shown in FIGS. 1 and 2 according to one embodiment of the present invention.

While the above-identified drawing figure sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

FIG. 1 is block diagram depicting a data transfer control system 100 having unaligned PIO data transfer capability to improve ATAPI device system performance by reducing command overhead according to one embodiment of the present invention. Data transfer control system 100 can be seen to include a parallel I/O data transfer controller 102 that includes a sector FIFO 104 and an ATAPI data buffer controller 106. An ATAPI device 108 is also shown. The ATAPI data buffer controller 106 is configured to allow the transfer of both unaligned and aligned data between the sector FIFO 104 and a host bus 110 and also between the sector FIFO 104 and the ATAPI device bus 112.

As stated herein before, ATAPI devices are only required to support aligned parallel I/O (PIO) data transfers since the ATAPI standard does not support unaligned PIO data transfers. The ATAPI standard allows only the last DRQ data transfer to have an odd byte count, while necessitating that all other DRQ data transfers have an even byte count in order to avoid unaligned PIO data transfers.

Unaligned PIO data transfer capability allows users to bundle several arbitrary byte count transfers into a single command transaction. This is desirable since multiple command transactions would otherwise be required whenever there is an odd byte count transfer. Known solutions to the foregoing problem have either prohibited unaligned data transfers or have used firmware to move data to or from ATAPI devices whenever the logic detected unaligned data transfers, which has degraded data transfer performance whenever unaligned data transfers occurred.

FIG. 2 is a more detailed block diagram 200 illustrating simultaneous data transfer read and write operations between a host device and a 32-bit sector FIFO 104, as well as between an ATAPI device 108 and the 32-bit sector FIFO 104 according to one embodiment of the present invention.

FIG. 3 is a more detailed block diagram 300 of the ATAPI data buffer controller 106 shown in FIGS. 1 and 2 according to one embodiment of the present invention. Six byte data buffers 302–312 with their full flags 314–324 are implemented to buffer data between sector FIFO 104 and the ATAPI 16-bit data bus 112. The first four byte data buffers 302–308 are used to buffer the read data from sector FIFO 104 for the host write direction and to buffer the received data from the ATAPI device 108 for the host read direction. The last two buffers 310, 312 are treated as pipeline data buffers in conjunction with byte data buffers 302–308 to provide pipeline stage. In this way, the necessity for a wait stage for buffer space available or buffer data available is eliminated.

Figure 4:
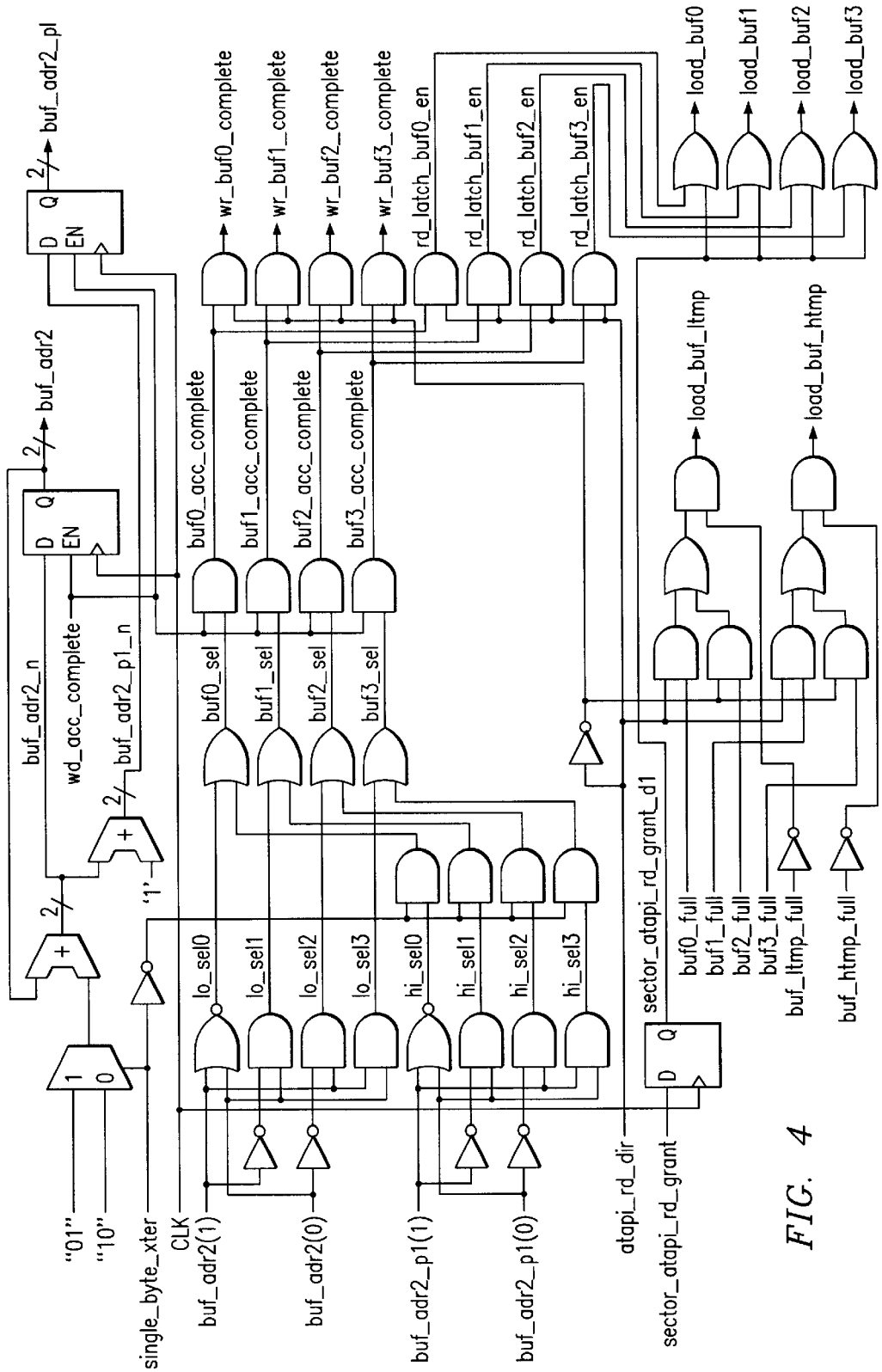
FIG. 4 is a schematic diagram showing the logic elements configured to control data transfer read and write operations associated with the six byte data buffers depicted in FIG. 3.
Figure 5A:
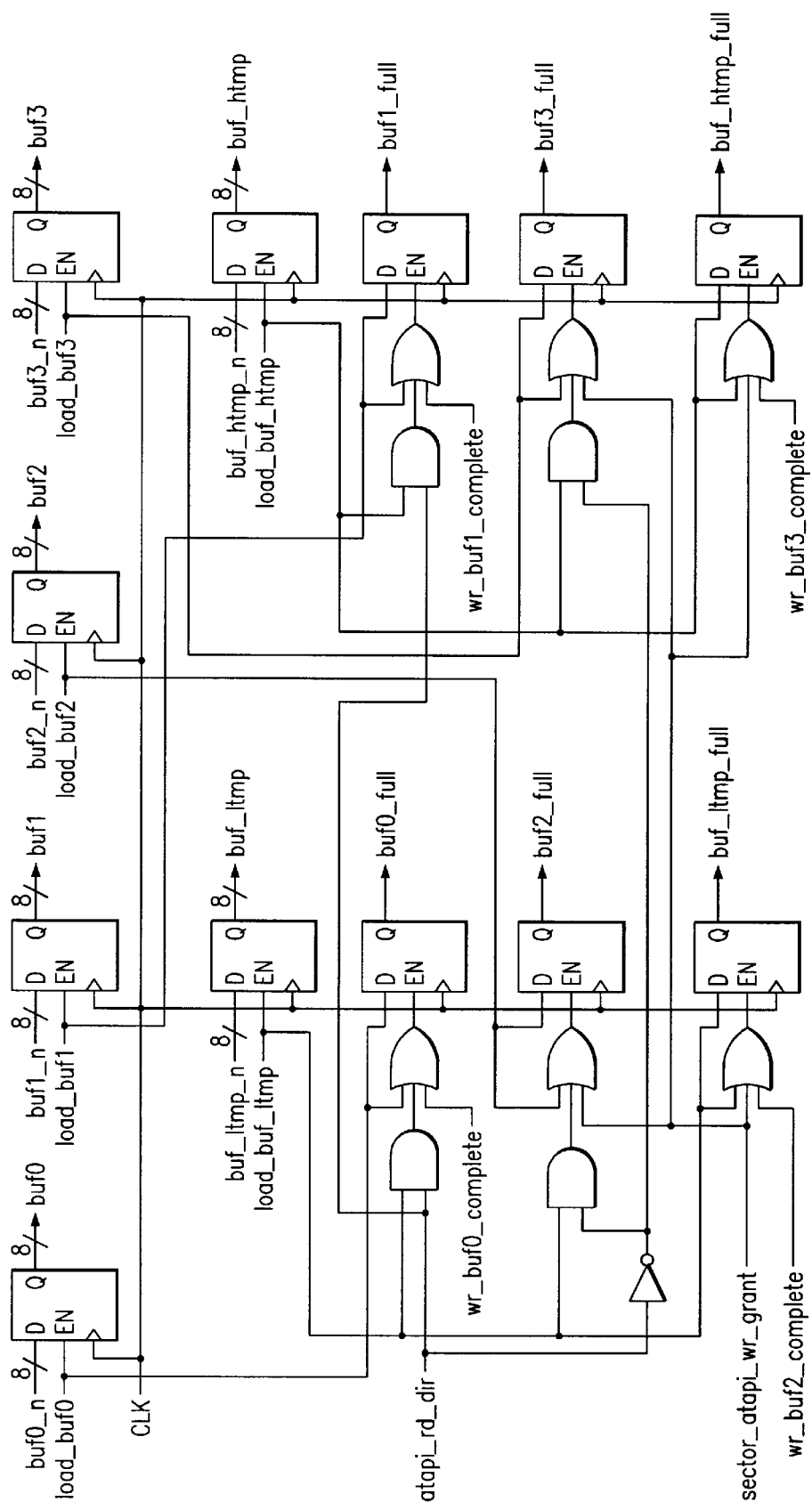
FIG. 5 is a schematic diagram showing the logic elements configured to control data transfer read and write operations associated with the six byte data buffers and respective full flags depicted in FIG. 3.
Figure 5B:
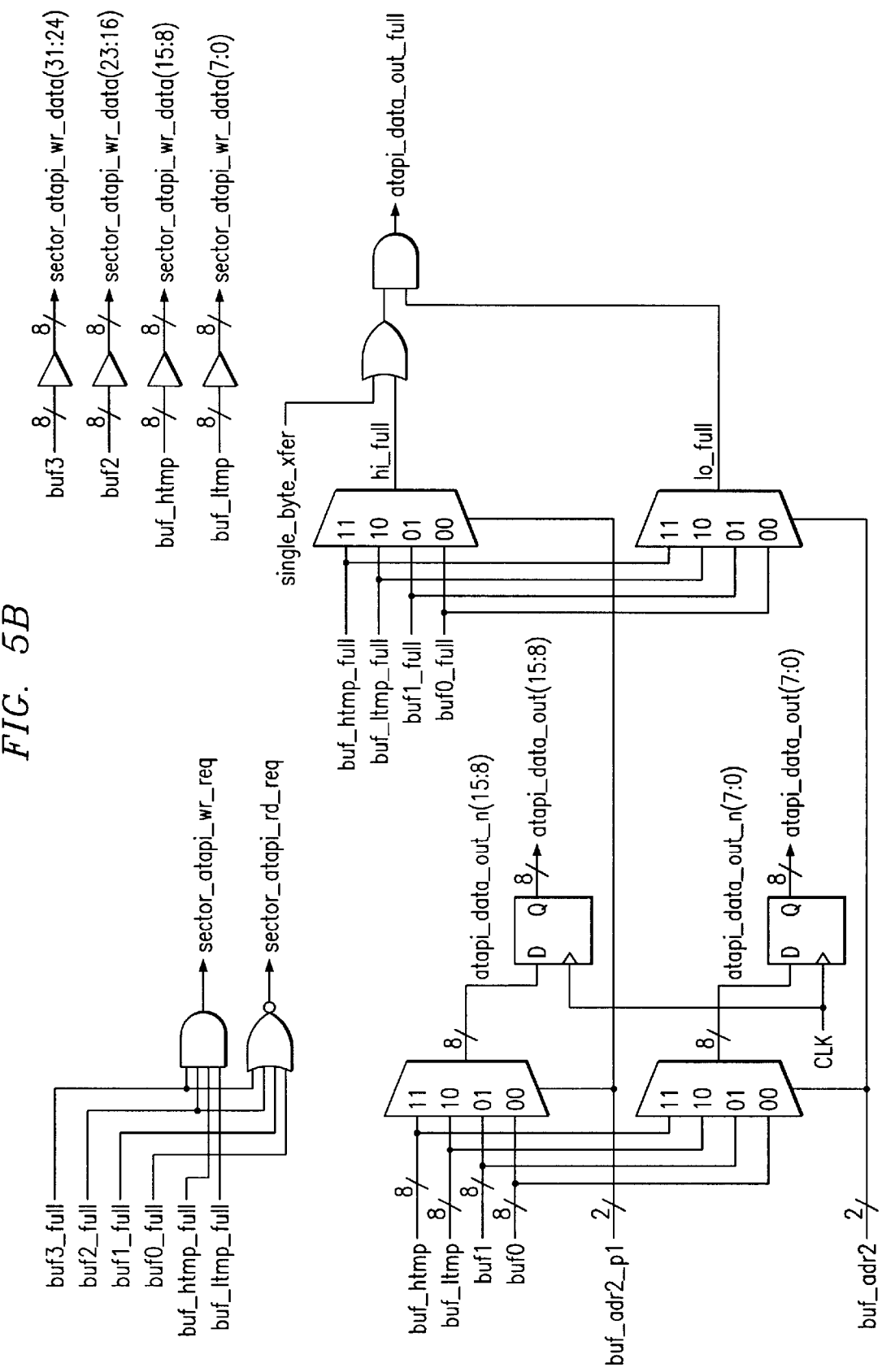

A pair of two bit addresses, buf_adr2 and buf_adr2_p1, shown in FIGS. 4 and 5, point to byte buffers for data source or data space. Specifically, buf_adr2 is used to indicate ATAPI 16-bit data bus low order 8-bit byte (atapi_data_in (7:0), atapi_data_out(7:0)). Buf_adr2_p1 is the value of (buf_adr2+1); and it is used to indicate ATAPI 16-bit data bus high order 8-bit byte (atapi_data_in(15:8), atapi_data_out(15:8)). Importantly, since each upper and lower byte of ATAPI 16-bit data bus 112 is individually controllable, both unaligned and aligned data transfers can be accommodated. Buf_adr2 will select a data byte from data buffers to drive atapi_data_out(7:0); and buf_adr2_p1 will select a data byte from data buffers to drive atapi_data_out(15:8) for host write operations. Buf_adr2 will select a data byte space from data buffers to store the next received data from atapi_data_in(7:0); and buf_adr2_p1 will select a data byte space from data buffers to store the next receive data from atapi_data_in(15:8) for host read operations.

FIG. 4 is a schematic diagram showing the logic elements configured to control data transfer read and write operations associated with the six byte data buffers 302–312 depicted in FIG. 3.

FIG. 5 is a schematic diagram showing the logic elements configured to control data transfer read and write operations associated with the six byte data buffers 302–308, six byte-full flags 314–324 and ATAPI write data depicted in FIGS. 2–3.

Whenever the four byte data buffers 302–308 are empty for host write operations, the ATAPI data buffer controller 106 will continue to pre-fetch the next quadlet from sector FIFO 104 until sector FIFO 104 is empty. When byte data buffers 302–308 are empty, buffers 310 and 312 still hold two bytes of data; and the data can continue to be written to the ATAPI device 108.

When byte data buffers 302, 304, 310, 312 are full for host read operations, the ATAPI data buffer controller 106 will write the whole quadlet into the sector FIFO 104 if the sector FIFO 104 is not full. When byte data buffers 302, 304, 310, 312 are full, byte buffers 306 and 308 are empty; and then buffers 306 and 308 can store the next received data from ATAPI device 108 during that time.

In summary explanation, a parallel I/O data transfer controller 102 supports both aligned and unaligned PIO data transfers associated with ATAPI devices in a fashion that reduces command overhead to improve ATAPI device system performance. A 32-bit wide sector FIFO 104, implemented with a 32-bit single port RAM using read and write pointer control logic, is used to store packet data transmitted to and received from the other data bus (i.e. USB). The 32-bit single port RAM functions as a FIFO to allow both the USB side and the ATAPI side to simultaneously access the sector FIFO 104.

It can be appreciated that a single port RAM used as a FIFO with read and write pointer logic only allows one access at any given time. Since USB 110 does not allow the insertion of a wait state while a packet is transferring, and since ATAPI has handshake control signals to allow insertion of a wait state, USB 110 has higher priority than the ATAPI side as described in further detail herein below. USB 2.0 provides for a high speed transfer rate of 480 Mb/s and internal clock in data transfer control system 100, except USB 2.0 UTM provides for a 60 MHz clock; so at high speed, USB 2.0 UTM will generate or require one byte of data each clock. The 32-bit sector FIFO 104 is then employed to reduce access frequency from USB 110 to one access every four clock cycles while providing three remaining clock cycles for the ATAPI side to access the sector FIFO 104.

When both the USB side and ATAPI side access the sector FIFO 104 at the same time, ATAPI access will be delayed by one clock cycle since ATAPI access has lower priority. This process is accommodated with the six byte data buffers 302–312 that are employed to buffer one more ATAPI 16-bit transfer than that which would be provided using only four such byte data buffers, thereby avoiding the insertion of a wait state. When both the USB side and ATAPI side access the sector FIFO 104 at the same time, the access is cascaded to allow USB access followed immediately by ATAPI access.

The present invention described in association with the foregoing embodiments provides high performance when compared with other solutions that support only aligned data transfers and/or that allow only the last DRQ data transfer to have an odd byte count.

In view of the above, it can be seen the present invention presents a significant advancement in the art of ATAPI device PIO data transfer techniques. Further, this invention has been described in considerable detail in order to provide those skilled in the ATAPI device PIO data transfer controller art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A parallel input/output (PIO) data transfer controller comprising:
   a sector FIFO in substantially simultaneous communication with a host device and an Advanced Technology Attachment Packet Interface (ATAPI) device; and
   an ATAPT data buffer controller, wherein the ATAPI data buffer controller is configured to control sector FIFO read and write operations such that the sector FIFO communicates substantially simultaneously with the host device via a host bus and with the ATAPI device via an ATAPI device data bus;
   wherein in the sector FIFO comprises a single port random access memory (RAM).

2. The PIO data transfer controller according to claim 1 wherein the sector FIFO further comprises read and write pointer control logic configured to communicate with the single port RAM such that the RAM functions to perform FIFO operations.

3. The PIO data transfer controller according to claim 1 wherein the ATAPI data buffer controller comprises a plurality of byte data buffers having full flags configured to buffer data between the sector FIFO and the ATAPI device data bus.

4. The PIO data transfer controller according to claim 3 wherein first predetermined byte data buffers selected from the plurality of data buffers are configured to buffer read data from the sector FIFO for host device write operations and further configured to buffer received data from the ATAPI device for host device read operations.

5. The PIO data transfer controller according to claim 3 wherein second predetermined byte data buffers selected from the plurality of data buffers are configured as pipeline data buffers to eliminate wait stages associated with data buffer space available and further configured to eliminate wait stages associated with buffer data available.

6. The PIO data transfer controller according to claim 1 wherein the host bus is a universal serial bus (USB).

7. The PIO data transfer controller according to claim 1 wherein the sector FIFO, controlled by the ATAPI data buffer controller, selectively transfers both unaligned and aligned PIO data.

8. A parallel input/output (PIO) data transfer controller comprising:
   a single port random access memory (RAM) in substantially simultaneous communication with a host device and an Advanced Technology Attachment Packet Interface (ATAPI) device; and
   read and write pointer control logic configured to communicate with the single port RAM such that the RAM functions as a sector FIFO to communicate substantially simultaneously with the host device via a host bus and with the ATAPI device via an ATAPI device data bus to selectively transfer both unaligned and aligned PIO data.

9. The PIO data transfer controller according to claim 8 further comprising a plurality of byte data buffers having full flags configured to buffer data between the sector FIFO and the ATAPI device data bus.

10. The PIO data transfer controller according to claim 9 wherein first plurality of predetermined byte data buffers selected from the plurality of byte data buffers are configured to buffer read data from the sector FIFO for host device write operations and further configured to buffer received data from the ATAPI device for host device read operations.

11. The PIO data transfer controller according to claim 10 wherein a second plurality of predetermined byte data buffers selected from the plurality of byte data buffers are configured as pipeline data buffers to eliminate wait stages associated with byte data buffer space available and further configured to eliminate wait stages associated with buffer data available.

12. The PIO data transfer controller according to claim 8 wherein the host bus is a universal serial bus (USB).

13. A parallel input/output (PIO) data transfer controller comprising:
   a single port random access memory (RAM) in substantially simultaneous communication with a host device and an Advanced Technology Attachment Packet Interface (ATAPI) device; and
   means for communicating with the single port RAM such that the RAM functions as a sector FIFO to communicate substantially simultaneously with the host device via a host bus and with the ATAPI device via an ATAPI device data bus to selectively transfer both unaligned and aligned PIO data.

14. The PIO data transfer controller according to claim 13 wherein the means for communicating with the single port RAM comprises read and write pointer control logic.

15. The PIO data transfer controller according to claim 14 wherein the means for communicating with the single port RAM further comprises a plurality of byte data buffers having full flags configured to buffer data between the sector FIFO and the ATAPI device data bus.

16. The PIO data transfer controller according to claim 15 wherein a first plurality of predetermined byte data buffers selected from the plurality of byte data buffers are configured to buffer read data from the sector FIFO for host device write operations and further configured to buffer received data from the ATAPI device for host device read operations.

17. The PIO data transfer controller according to claim 16 wherein a second plurality of predetermined byte data buffers selected from the plurality of byte data buffers are configured as pipeline data buffers to eliminate wait stages associated with byte data buffer space available and further configured to eliminate wait stages associated with buffer data available.

18. The PIO data transfer controller according to claim 13 wherein the host bus is a universal serial bus USB.

* * * * *